US012663385B2

(12) United States Patent
Zhang et al.

(10) Patent No.: US 12,663,385 B2
(45) Date of Patent: Jun. 23, 2026

(54) INSPECTION METHOD AND INSPECTION APPARATUS FOR WOUND CELL

(71) Applicant: CONTEMPORARY AMPEREX TECHNOLOGY (HONG KONG) LIMITED, Hong Kong (CN)

(72) Inventors: Fenglin Zhang, Ningde (CN); Jianlin Liu, Ningde (CN); Shaoteng Ren, Ningde (CN); Yingqin Su, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 285 days.

(21) Appl. No.: 18/448,909

(22) Filed: Aug. 12, 2023

(65) Prior Publication Data

US 2024/0094146 A1     Mar. 21, 2024

Related U.S. Application Data

(63) Continuation of application No. PCT/CN2022/119191, filed on Sep. 16, 2022.

(51) Int. Cl.
*G01N 23/04* (2018.01)
*H01M 10/42* (2006.01)
(52) U.S. Cl.
CPC ........ *G01N 23/04* (2013.01); *H01M 10/4285* (2013.01); *G01N 2223/1016* (2013.01)
(58) Field of Classification Search
CPC .......... G01N 23/04; G01N 2223/1016; H01M 10/4285; H01M 10/0431; Y02E 60/10
See application file for complete search history.

(56) References Cited

U.S. PATENT DOCUMENTS

| | | | |
|---|---|---|---|
| 6,549,649 B1 * | 4/2003 | Penkethman ...... | G01R 31/2891 |
| | | | 250/559.1 |
| 2014/0254767 A1 | 9/2014 | Boye et al. | |
| 2023/0074096 A1 * | 3/2023 | Oh ..................... | H01M 50/557 |

FOREIGN PATENT DOCUMENTS

| | | |
|---|---|---|
| CN | 108120728 A | 6/2018 |
| CN | 207636021 U | 7/2018 |
| CN | 111416142 A | 7/2020 |
| CN | 114527149 A | 5/2022 |

(Continued)

OTHER PUBLICATIONS

Fukushima, Kunihiko. "Neocognitron: A self-organizing neural network model for a mechanism of pattern recognition unaffected by shift in position." Biological cybernetics 36.4 (1980): 193-202. (Year: 1980).*

(Continued)

*Primary Examiner* — Edwin C Gunberg
*Assistant Examiner* — Richard O Toohey
(74) *Attorney, Agent, or Firm* — ANOVA LAW GROUP, PLLC

(57) ABSTRACT

An inspection method includes obtaining an image of a corner region of the wound cell that includes an image of a cathode electrode plate at N layers of the corner region of the wound cell and an anode electrode plate at the N layers, and determining, based on the image of the corner region, amounts of misalignment between the cathode electrode plate and the anode electrode plate that are adjacent in the wound cell. N is a positive integer.

16 Claims, 6 Drawing Sheets

(56)             References Cited

FOREIGN PATENT DOCUMENTS

CN          114594114  A  *  6/2022   ............. G01N 23/04
WO     WO 2020250609  A1 *  12/2020   ........ H01M 10/0585

OTHER PUBLICATIONS

The European Patent Office (EPO) Extended Search Report for EP
Application No. 22919306.5 Aug. 12, 2024 8 Pages.
Yapeng Wu et al., "Pole-piece position distance identification of
cylindrical lithium-ion battery through x-ray testing technology".
Apr. 1, 2021, vol. 32, No. 4. Measurement Science And Technology.
The World Intellectual Property Organization (WIPO) International
Search Report and Written Opinion for PCT/CN2022/119191 May
19, 2023 15 pages (including English translation).
Xin Yan et al., "Application of X-Ray Detection Image Edge
Algorithm in Power Batteries", Nondestructive Testing, Sep. 30,
2016, pp. 14-16, vol. 38 (9).

* cited by examiner

Micro-focus X-ray source module 110

Site for inspection 140

Image obtaining module 120

Image processing and analysis module 130

210. Obtain an image of a corner region of a wound cell

220. Determine, based on the image of the corner region, amounts of misalignment between a cathode electrode plate and an anode electrode plate that are adjacent in the wound cell Anode electrode plate at the outmost layer Cathode electrode plate at the outmost layer

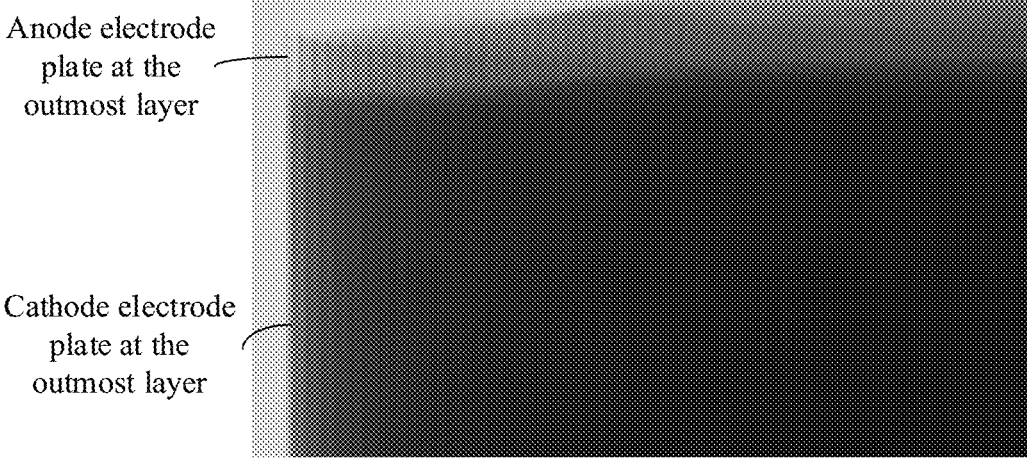

FIG. 4

510. Obtain an image of a corner region of a wound cell

520. Determine first endpoints on a first plane for a cathode electrode plate at each of N layers of the corner region and second endpoints on the first plane for an anode electrode plate at each of the N layers in the image of the corner region 530. Determine, based on the first endpoints and the second endpoints, amounts of misalignment between the cathode electrode plate and the anode electrode plate that are adjacent in the wound cell

FIG. 5

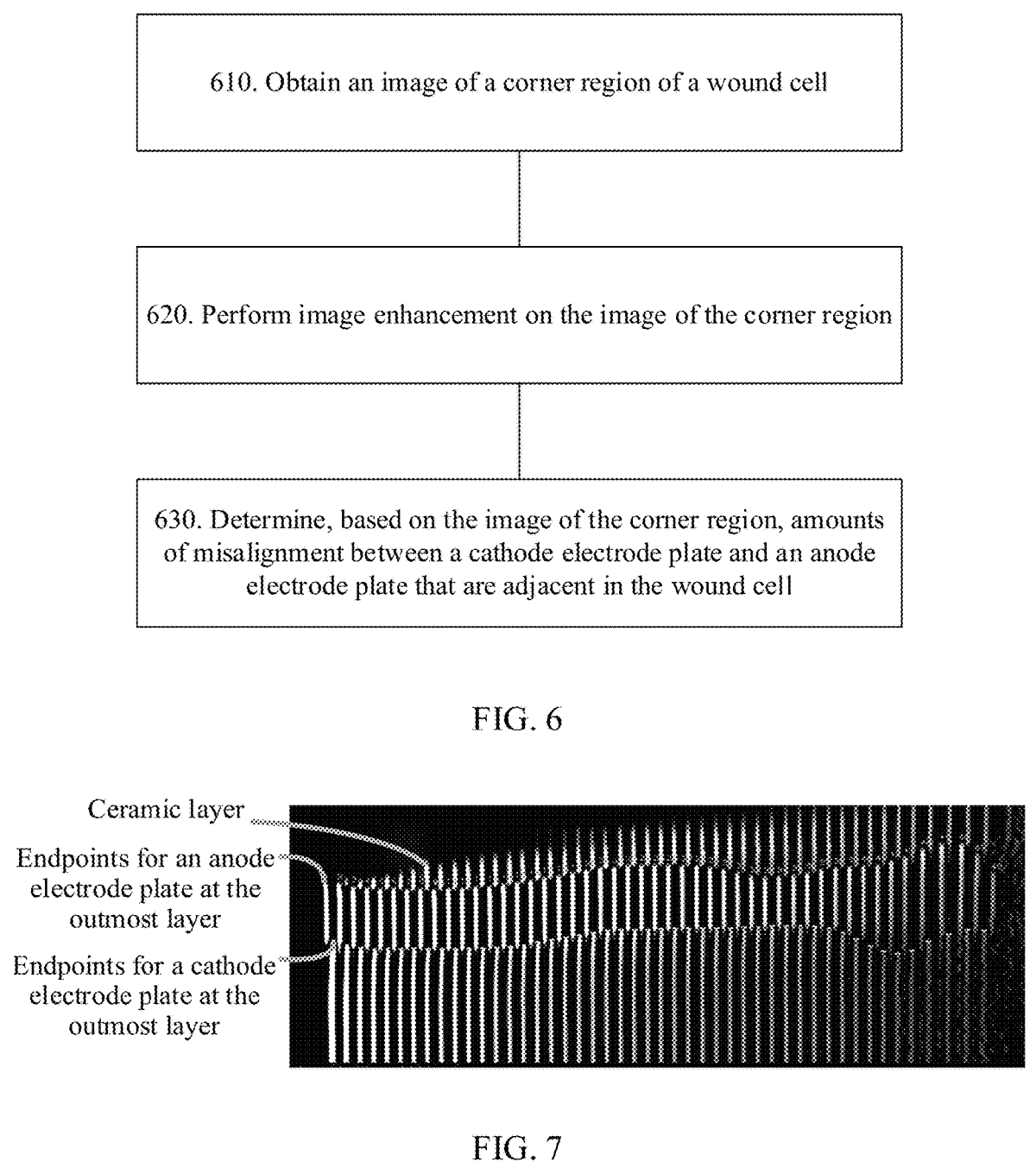

610. Obtain an image of a corner region of a wound cell

620. Perform image enhancement on the image of the corner region

630. Determine, based on the image of the corner region, amounts of misalignment between a cathode electrode plate and an anode electrode plate that are adjacent in the wound cell

FIG. 6

Ceramic layer

Endpoints for an anode electrode plate at the outmost layer

Endpoints for a cathode electrode plate at the outmost layer

FIG. 7

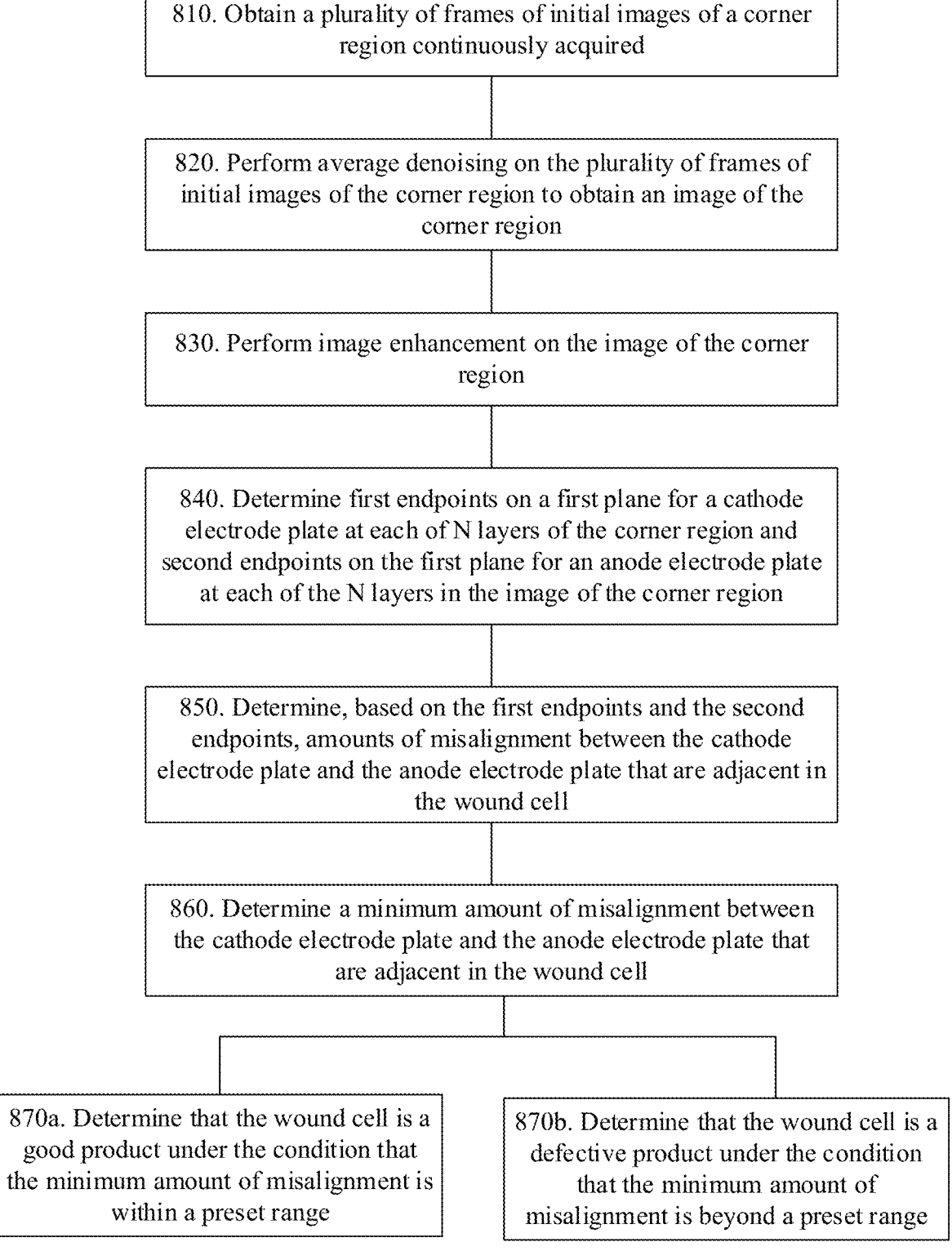

810. Obtain a plurality of frames of initial images of a corner region continuously acquired 820. Perform average denoising on the plurality of frames of initial images of the corner region to obtain an image of the corner region 830. Perform image enhancement on the image of the corner region 840. Determine first endpoints on a first plane for a cathode electrode plate at each of N layers of the corner region and second endpoints on the first plane for an anode electrode plate at each of the N layers in the image of the corner region 850. Determine, based on the first endpoints and the second endpoints, amounts of misalignment between the cathode electrode plate and the anode electrode plate that are adjacent in the wound cell 860. Determine a minimum amount of misalignment between the cathode electrode plate and the anode electrode plate that are adjacent in the wound cell 870a. Determine that the wound cell is a good product under the condition that the minimum amount of misalignment is within a preset range 870b. Determine that the wound cell is a defective product under the condition that the minimum amount of misalignment is beyond a preset range

FIG.8

INSPECTION METHOD AND INSPECTION APPARATUS FOR WOUND CELL

CROSS-REFERENCE TO RELATED APPLICATION

This application is a continuation of International Application No. PCT/CN2022/119191, filed on Sep. 16, 2022, the entire content of which is incorporated herein by reference.

TECHNICAL FIELD

This application relates to the field of battery technologies, and in particular, to an inspection method and inspection apparatus for wound cell.

BACKGROUND

During charging and discharging of a lithium battery, intercalation and extraction of lithium ions are repeated between a cathode electrode plate and an anode electrode plate. If the anode electrode plate is not capable of intercalation of all lithium ions extracted from the cathode electrode plate, the precipitated lithium ions accumulate, affecting the safety of a lithium battery product. Therefore, there must be a particular amount of misalignment between the cathode electrode plate and the anode electrode plate of a cell of the lithium battery, so that the cathode electrode plate is within a covering range of the anode electrode plate.

At present, for amounts of misalignment between the cathode electrode plate and the anode electrode plate of the wound cell, a charge coupled device (charge coupled device, CCD) camera is generally used in a winding process of producing the wound cell to measure the amounts of misalignment between the cathode electrode plate and the anode electrode plate layer by layer. However, in this inspection method, it is likely to lose focus in a certain range near a winding starting position and a winding terminating position and thus the amount of misalignment of the wound cell cannot be measured accurately.

SUMMARY

This application provides an inspection method and inspection apparatus for wound cell, capable of accurately measuring amounts of misalignment between a cathode electrode plate and an anode electrode plate that are adjacent in a wound cell.

According to a first aspect, an inspection method for wound cell is provided, including: obtaining an image of a corner region of the wound cell, where the image of the corner region includes an image of a cathode electrode plate at N layers of the corner region of the wound cell and an anode electrode plate at the N layers, N being a positive integer; and determining, based on the image of the corner region, amounts of misalignment between the cathode electrode plate and the anode electrode plate that are adjacent in the wound cell.

In the inspection method for wound cell provided in an embodiment of this application, amounts of misalignment in the wound cell can be accurately determined by using the image of the corner region of the wound cell, thereby preventing cell products with a nonconforming amount of misalignment from entering the market and ensuring the quality of cell products.

In a possible implementation, the image of the corner region is obtained by using a micro-focus X-ray source to emit X-rays that penetrate the corner region for imaging, where a direction of the X-rays is perpendicular to a direction of a winding axis of the wound cell.

In the inspection scheme for wound cell provided in an embodiment of this application, the image of the corner region can be quickly and accurately obtained by using a micro-focus X-ray source to emit X-rays that penetrate the corner region of the wound cell for imaging, so that the amounts of misalignment in the wound cell can be quickly and accurately determined, improving the inspection efficiency and ensuring the quality of cell products.

In a possible implementation, N is a total number of layers of the cathode electrode plate and anode electrode plate of the wound cell in the corner region.

In the inspection scheme for wound cell provided in an embodiment of this application, the image of the corner region including all layers of the cathode electrode plate and anode electrode plate can be obtained by using the micro-focus X-ray source to emit X-rays that penetrate the corner region of the wound cell for imaging, so that amounts of misalignment can be accurately measured for the cathode electrode plate and the anode electrode plates of the wound cell that are adjacent at all layers, preventing cell products with a nonconforming amount of misalignment from entering the market and ensuring the quality of cell products.

In a possible implementation, the determining, based on the image of the corner region, amounts of misalignment between the cathode electrode plate and the anode electrode plate that are adjacent in the wound cell includes: determining first endpoints on a first plane for the cathode electrode plate at each of the N layers of the corner region and second endpoints on the first plane for the anode electrode plate at each of the N layers in the image of the corner region, where the first plane is a plane that the winding axis is located on and that is perpendicular to the direction of the X-rays; and determining, based on the first endpoints and the second endpoints, amounts of misalignment between the cathode electrode plate and the anode electrode plate that are adjacent in the wound cell.

In the inspection scheme for wound cell provided in an embodiment of this application, when the X-ray penetrates the corner region for imaging, the grayscale of the anode electrode plate and the cathode electrode plate in the two-dimensional image of the corner region on the first plane that the winding axis of the wound cell is located on and that is perpendicular to the ray direction is quite different from that in other regions, which is easy to identify and differentiate. Therefore, with the endpoints on the first plane for layers of the cathode electrode plate and anode electrode plate in the wound cell, the amounts of misalignment between the cathode electrode plate and the anode electrode plate that are adjacent can be more clearly and accurately determined.

In a possible implementation, the determining first endpoints on a first plane for the cathode electrode plate at each of the N layers of the corner region and second endpoints on the first plane for the anode electrode plate at each of the N layers in the image of the corner region includes: using a neural network model to determine the first endpoints and the second endpoints, where the neural network model is obtained by training using a plurality of marked wound cell images, and the plurality of marked wound cell images include information about marked endpoints on the first plane for the cathode electrode plate and marked endpoints on the first plane for the anode electrode plate.

In the inspection scheme for wound cell provided in an embodiment of this application, the wound cell images are marked, and then the neural network model trained using the marked wound cell images is used so that the endpoints for the cathode electrode plate and the anode electrode plate can be accurately and quickly identified.

In a possible implementation, before the determining, based on the image of the corner region, amounts of misalignment between the cathode electrode plate and the anode electrode plate that are adjacent in the wound cell, the method further includes performing image enhancement on the image of the corner region.

In the inspection scheme for wound cell provided in an embodiment of this application, the visual effect of the image can be improved by performing image enhancement on the image of the corner region, for example, by increasing image definition, so that the amount of misalignment can be accurately measured and manual re-inspection can be conveniently performed by operators on the production line.

In a possible implementation, the performing image enhancement on the image of the corner region includes increasing contrast of the image of the corner region to highlight pixels on the first plane for the cathode electrode plate at each of the N layers and pixels on the first plane for the anode electrode plate at each of the N layers.

In the inspection scheme for wound cell provided in an embodiment of this application, the pixels on the first plane for layers of the cathode electrode plate and anode electrode plate can be highlighted by increasing the contrast of the image of the corner region, thereby facilitating accurate identification of the endpoints for layers of the cathode electrode plate and anode electrode plate and improving the accuracy in measuring amounts of misalignment.

In a possible implementation, the performing image enhancement on the image of the corner region further includes using a first grayscale value to replace a grayscale value for a first region and using a second grayscale value to replace grayscale values for other regions in the image of the corner region except the first region, where the first region includes a region in which pixels on the first plane for the anode electrode plate at each of the N layers and pixels on the first plane for the cathode electrode plate at each of the N layers are located.

In the inspection scheme for wound cell provided in an embodiment of this application, the first grayscale value can be used to replace the grayscale values on the first plane for layers of the anode electrode plate and the cathode electrode plate, and the second grayscale value can be used to replace grayscale values for other regions in the image of the corner region. In this way, only the images of the cathode electrode plate and the anode electrode plate on the first plane can be clearly highlighted in the enhanced image of the corner region, which is convenient for identifying the first endpoints for the cathode electrode plate and the second endpoints for the anode electrode plate so that the amounts of misalignment can be accurately measured.

In a possible implementation, before obtaining an image of a corner region of the wound cell, the method further includes: obtaining a plurality of initial image frames of the corner region continuously acquired; and performing average denoising on the plurality of initial image frames of the corner region to obtain the image of the corner region.

In the inspection scheme for wound cell provided in an embodiment of this application, parallel denoising is performed on the plurality of initial image frames of the corner region continuously acquired so that noises caused by an imaging device and external environments are suppressed, improving the quality of the image of the corner region.

In a possible implementation, a control power of the micro-focus X-ray source is positively related to the thickness of the corner region.

In the inspection scheme for wound cell provided in an embodiment of this application, corner regions with different thicknesses can be imaged by adjusting the control power of the micro-focus X-ray source. A greater control power of the micro-focus X-ray source can be used for a thicker corner region of the wound cell, so that the image of cathode electrode plates and anode electrode plates that are adjacent in corner regions with different thicknesses can be obtained by adjusting the control power of the micro-focus X-ray source.

In a possible implementation, the corner region includes four corner regions of the wound cell.

In the inspection scheme for wound cell provided in an embodiment of this application, the accuracy in measuring amounts of misalignment in the wound cell can be improved by measuring amounts of misalignment between the cathode electrode plate and the anode electrode plate that are adjacent in four corner regions of the wound cell.

In a possible implementation, the method further includes: determining a minimum amount of misalignment between the cathode electrode plate and the anode electrode plate that are adjacent in the wound cell; determining that the wound cell is a good product under the condition that the minimum amount of misalignment is within a preset range; and determining that the wound cell is a defective product under the condition that the minimum amount of misalignment is beyond the preset range.

In the inspection scheme for wound cell provided in an embodiment of this application, the inspection efficiency can be improved by using a minimum one of all amounts of misalignment to determine whether the wound cell is a good product.

According to a second aspect, an inspection apparatus for wound cell is provided, including: an obtaining unit, configured to obtain an image of a corner region of the wound cell, where the image of the corner region includes an image of a cathode electrode plate at N layers of the corner region of the wound cell and an anode electrode plate at the N layers, N being a positive integer; and a control unit, configured to determine, based on the image of the corner region, amounts of misalignment between the cathode electrode plate and the anode electrode plate that are adjacent in the wound cell.

In a possible implementation, the image of the corner region is obtained by using a micro-focus X-ray source to emit X-rays that penetrate the corner region for imaging, where a direction of the X-rays is perpendicular to a direction of a winding axis of the wound cell.

In a possible implementation, N is a total number of layers of the cathode electrode plate and anode electrode plate of the wound cell in the corner region.

In a possible implementation, the control unit is configured to: determine first endpoints on a first plane for the cathode electrode plate at each of the N layers of the corner region and second endpoints on the first plane for the anode electrode plate at each of the N layers in the image of the corner region, where the first plane is a plane that the winding axis is located on and that is perpendicular to the direction of the X-rays; and determine, based on the first endpoints and the second endpoints, amounts of misalignment between the cathode electrode plate and the anode electrode plate that are adjacent in the wound cell.

In a possible implementation, the control unit is configured to use a neural network model to determine the first endpoints and the second endpoints, where the neural network model is obtained by training using a plurality of marked wound cell images, and the plurality of marked wound cell images include information about marked endpoints on the first plane for the cathode electrode plate and marked endpoints on the first plane for the marked anode electrode plate.

In a possible implementation, the control unit is further configured to perform image enhancement on the image of the corner region.

In a possible implementation, the control unit is configured to increase contrast of the image of the corner region to highlight pixels on the first plane for the cathode electrode plate at each of the N layers and pixels on the first plane for the anode electrode plate at each of the N layers.

In a possible implementation, the control unit is configured to use a first grayscale value to replace a grayscale value for a first region and use a second grayscale value to replace grayscale values for other regions in the image of the corner region except the first region, where the first region includes a region in which pixels on the first plane for the anode electrode plate at each of the N layers and pixels on the first plane for the cathode electrode plate at each of the N layers are located.

In a possible implementation, the obtaining unit is configured to: obtain a plurality of initial image frames of the corner region continuously acquired; and perform average denoising on the plurality of initial image frames of the corner region to obtain the image of the corner region.

In a possible implementation, a control power of the micro-focus X-ray source is positively related to the thickness of the corner region.

In a possible implementation, the corner region includes four corner regions of the wound cell.

In a possible implementation, the control unit is further configured to: determine a minimum amount of misalignment between the cathode electrode plate and the anode electrode plate that are adjacent in the wound cell; determine that the wound cell is a good product under the condition that the minimum amount of misalignment is within a preset range; and determine that the wound cell is a defective product under the condition that the minimum amount of misalignment is beyond the preset range.

According to a third aspect, an inspection apparatus for wound cell is provided. The inspection apparatus includes a memory and a processor, where the memory is configured to store instructions, and the processor is configured to read the instructions and perform, according to the instructions, the method according to any one of the first aspect and the possible implementations of the first aspect.

According to a fourth aspect, a computer-readable storage medium is provided. The computer-readable storage medium is configured to store a computer program, where the computer program enables a computer to perform the method according to any one of the first aspect and the possible implementations of the first aspect.

According to a fifth aspect, a computer program product is provided. The computer program product includes computer program instructions, where the computer program instructions enable a computer to perform the method according to any one of the first aspect and the possible implementations of the first aspect.

According to a sixth aspect, a chip is provided. The chip includes a processor configured to call and run a computer program from a memory, so that a device on which the chip is installed performs the method according to any one of the first aspect and the possible implementations of the first aspect.

According to a seventh aspect, a computer program is provided. The computer program enables a computer to perform the method according to any one of the first aspect and the possible implementations of the first aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

FIG. 4 is an image of a corner region according to an embodiment of this application.

FIG. 5 is a schematic flowchart of an inspection method for wound cell according to an embodiment of this application.

FIG. 6 is a schematic flowchart of an inspection method for wound cell according to an embodiment of this application.

FIG. 7 is an image of a corner region after image enhancement according to an embodiment of this application.

FIG. 8 is a schematic flowchart of an inspection method for wound cell according to an embodiment of this application.

DESCRIPTION OF EMBODIMENTS

Figures 1, 2:
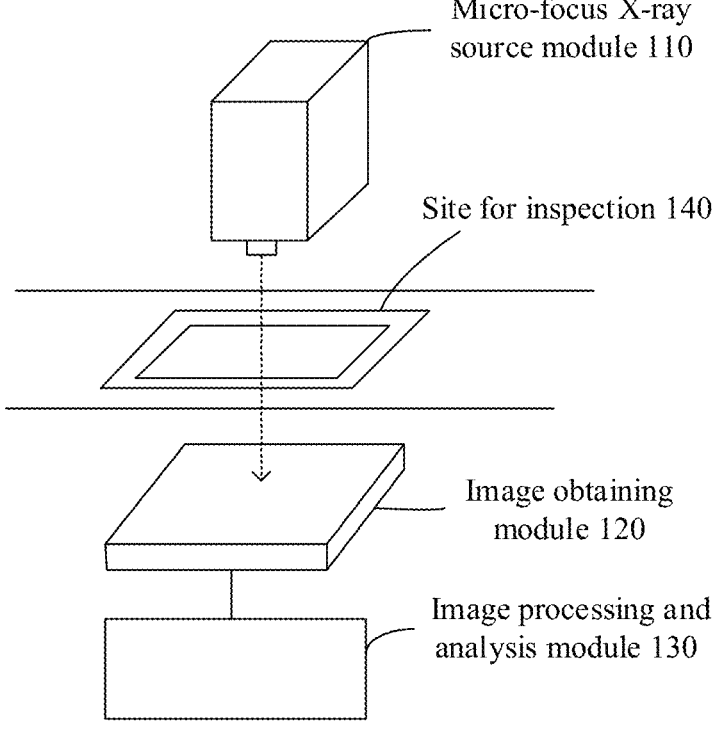
FIG. 1 is a schematic architectural diagram of an inspection system for wound cell according to an embodiment of this application.
FIG. 2 is a schematic flowchart of an inspection method for wound cell according to an embodiment of this application.

The following further describes the implementations of this application in detail with reference to the accompanying drawings and embodiments. The detailed description and accompanying drawings of the following embodiments are intended to illustrate the principle of this application, but are not intended to limit the scope of this application. This application is not limited to the embodiments described herein.

In the descriptions of this application, it should be noted that, unless otherwise stated, "plurality" means two or more; and the orientations or positional relationships indicated by the terms "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first" and "second" are merely intended for a purpose of description, and shall not be understood as an indication or implication of relative importance. "Perpendicular" means being perpendicular with an allowable range of error other than being strictly perpendicular.

The orientation terms appearing in the following description all are directions shown in the figures, and do not limit the specific structure of the application. In the descriptions of this application, it should be further noted that unless otherwise specified and defined explicitly, the term "connect", should be understood in its general senses. For example, the term may be a fixed connection, a detachable connection, or an integrated connection, or may be a direct connection, or an indirect connection through an intermediate medium. Persons of ordinary skill in the art can understand specific meanings of the term in this application based on specific situations.

With continuous development of new energy technology, the safety of new energy products has gradually become the focus of major manufacturers and consumer groups. Major new energy product manufacturers have implemented stricter control over defects in the product manufacturing process to ensure the safety of products entering the market.

During charging and discharging of a lithium battery, intercalation and extraction of lithium ions are repeated between a cathode electrode plate and an anode electrode plate. If the anode electrode plate is not capable of intercalation of all lithium ions extracted from the cathode electrode plate, the precipitated lithium ions accumulate, affecting the safety of a lithium battery product. Therefore, there must be a particular amount of misalignment between the cathode electrode plate and the anode electrode plate of a cell of the lithium battery, so that the cathode electrode plate is within a covering range of the anode electrode plate.

At present, a CCD camera is generally used in a winding process of producing the wound cell to measure the amounts of misalignment between the cathode electrode plate and the anode electrode plate layer by layer. However, in this inspection method, it is likely to lose focus in a certain range near a winding starting position and a winding terminating position and thus the amount of misalignment of the wound cell cannot be measured accurately.

In view of this, an embodiment of this application provides an inspection method for wound cell. The inspection method includes: obtaining an image of a corner region of the wound cell, where the image of the corner region includes an image of a cathode electrode plate at N layers of the corner region of the wound cell and an anode electrode plate at the N layers, N being a positive integer; and determining, based on the image of the corner region, amounts of misalignment between the cathode electrode plate and the anode electrode plate that are adjacent in the wound cell.

In the inspection scheme for wound cell provided in this embodiment of this application, amounts of misalignment between the cathode electrode plate and the anode electrode plate that are adjacent in the wound cell can be accurately determined by using the image of the corner region of the wound cell, thereby preventing wound cell products with nonconforming misalignment from entering the market and ensuring the quality of cell products.

FIG. 1 is a schematic architectural diagram of an inspection system for wound cell according to an embodiment of this application.

The inspection system for wound cell may include a micro-focus X-ray source module 110, an image obtaining module 120, an image processing and analysis module 130, and a site for inspection 140.

The micro-focus X-ray source module 110 may generate and emit X-rays at a specific emission angle. X-rays penetrating an object under inspection, such as a wound cell, on the site for inspection 140 are absorbed by the object under inspection and attenuated, and substances with different densities, thicknesses, and materials absorb the X-rays differently.

The image obtaining module 120 may receive X-rays of different intensities after penetration of the object under inspection, generate electrical signals proportional to the intensities of the X-rays, and present the electrical signals in a form of grayscale images, thereby obtaining an image reflecting structure information of the object under inspection. In this embodiment of this application, the image obtaining module 120 may obtain an image of a corner region of a wound cell.

Optionally, in this embodiment of this application, the image obtaining module 120 may include a flat panel detector and a display.

The image processing and analysis module 130 may process and analyze the image obtained by the image obtaining module 120. In this embodiment of this application, the image processing and analysis module 130 may determine, based on the image of the corner region, amounts of misalignment between the cathode electrode plate and the anode electrode plate that are adjacent in the wound cell.

Optionally, in this embodiment of this application, the inspection system for wound cell may include four micro-focus X-ray source modules 110, four image obtaining modules 120 and four sites for inspection 140. In this way, continuous inspection can be performed on four corner regions of the wound cell, improving the inspection efficiency.

Optionally, in this embodiment of this application, the inspection system for wound cell may further include a conveying track for the object under inspection to move thereon. For example, the object under inspection may be moved from a placement site to the site for inspection through the conveying track, or from one site for inspection to a next site for inspection.

Modules in the inspection system for wound cell may be implemented in a form of software invoked by a processor. For example, the modules in the inspection system include a processor, the processor is connected to a memory, and instructions are stored in the memory. The processor invokes the instructions stored in the memory to implement any of the foregoing methods or to implement functions of units of the apparatus, where the processor is, for example, a general-purpose processor, such as a central processing unit (central processing unit, CPU) or a microprocessor, and the memory is a memory internal or external to the apparatus. Alternatively, the modules of the inspection system may be implemented in a form of hardware circuits, and the functions of some or all units may be implemented through the design of the hardware circuits. The hardware circuits may be understood as one or more processors. For example, in one implementation, the hardware circuits are application-specific integrated circuits (application-specific integrated circuit, ASIC) and implement the functions of some or all of the foregoing units through the design of logical relationships between the elements in the circuit. For another example, in another implementation, the hardware circuits may be implemented by programmable logic devices (programmable logic device, PLD). The field programmable gate array (field programmable gate array, FPGA) is used as an example, may include a large number of logic gate circuits and implement the functions of some or all of the foregoing units through connection relationships among logic gate circuits configured by a configuration file. The foregoing modules of the inspection system may all be implemented in a form of software invoked by a processor or in a form of hardware circuits, or partly in a form of software invoked by the processor while the rest are implemented in a form of hardware circuits.

Optionally, the foregoing components are just an example. In practical applications, the foregoing components may be added or removed according to actual needs. FIG. 1 shall not be construed as a limitation on the embodiments of this application.

FIG. 2 is a schematic flowchart of an inspection method for wound cell according to an embodiment of this application.

210. Obtain an image of a corner region of a wound cell.

The image of the corner region includes an image of a cathode electrode plate at N layers of the corner region of the wound cell and an anode electrode plate at the N layers, N being a positive integer.

Figure 3:
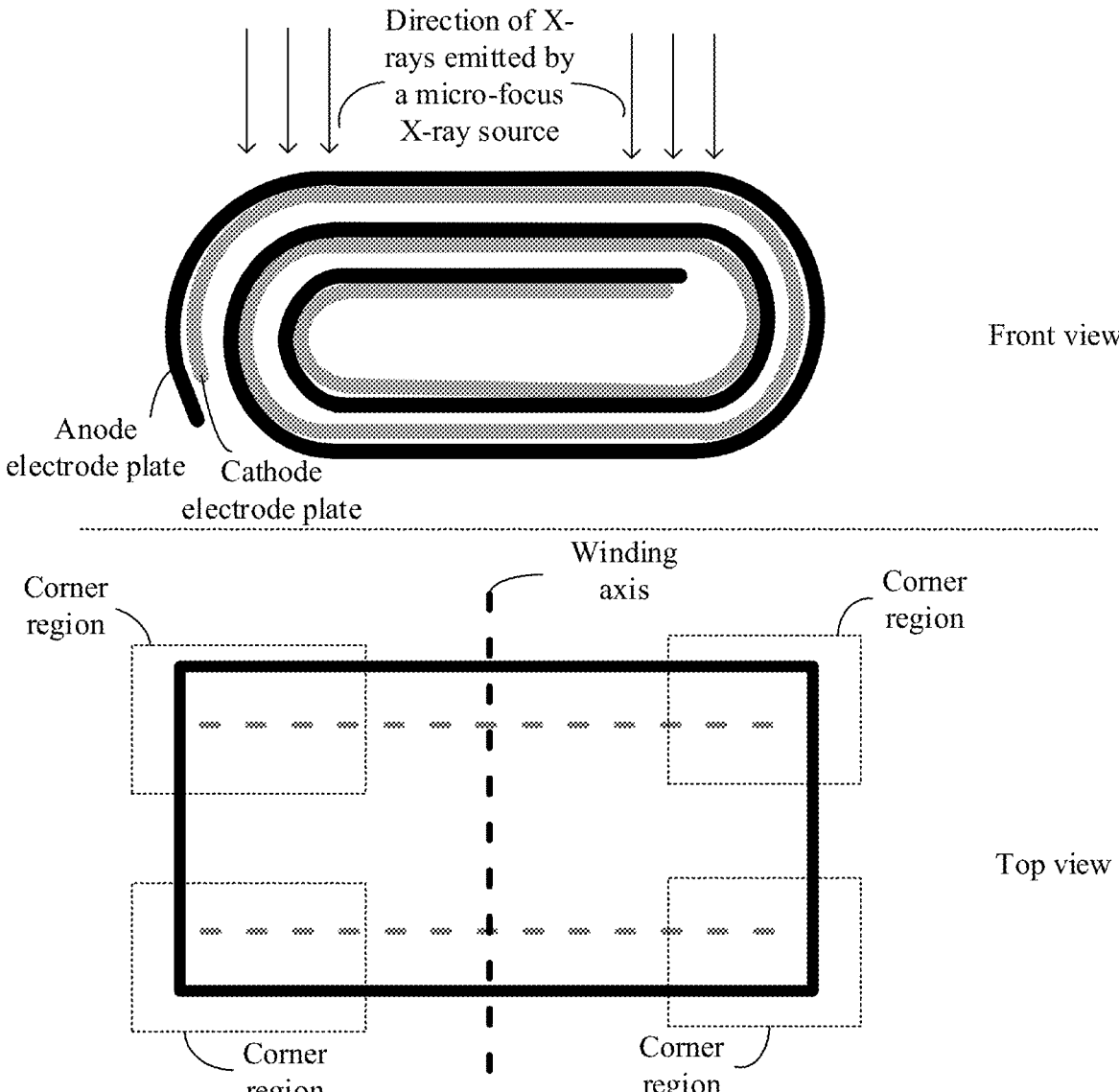
FIG. 3 is a schematic diagram of a partial structure of a wound cell according to an embodiment of this application.

FIG. 3 is a schematic diagram of a partial structure of a wound cell according to an embodiment of this application. The wound cell includes a cathode electrode plate and an anode electrode plate, and a width of the cathode electrode plate may be different from a width of the anode electrode plate in a width direction of the wound cell. For example, the width of the anode electrode plate is greater than the width of the cathode electrode plate in the wound cell of a lithium battery, so that the anode electrode plate covers a greater range on both sides of the width direction at each layer of the wound cell than the cathode electrode plate, thereby avoiding product safety problems caused by lithium precipitation.

As shown in FIG. 3, the wound cell may include corner regions. An image of a corner region of the wound cell can be obtained by imaging the corner region of the wound cell.

FIG. 4 is an image of a corner region of a wound cell according to an embodiment of this application. As shown in FIG. 4, the image of the corner region includes an image of a cathode electrode plate and an anode electrode plate at a plurality of layers of the corner region of the wound cell. Because great differences in grayscale or color exist between the anode electrode plate and the cathode electrode plate in the image of the corner region, it is possible to identify which electrode plates are the anode electrode plates or which electrode plates are the cathode electrode plates in the image of the corner region based on the grayscale or color. It can be seen from FIG. 4 that the width of the anode electrode plate in the wound cell is greater than that of the cathode electrode plate, that is, there is a certain amount of misalignment between the anode electrode plate and the cathode electrode plate.

220. Determine, based on the image of the corner region, amounts of misalignment between a cathode electrode plate and an anode electrode plate that are adjacent in the wound cell.

In this embodiment, the amount of misalignment between the cathode electrode plate and the anode electrode plate that are adjacent may be an amount of misalignment between the cathode electrode plate at a particular layer and the anode electrode plate adjacent to the cathode electrode plate at the layer. For example, for the Kth layer (not the innermost layer), an amount of misalignment between the cathode electrode plate at the Kth layer and the anode electrode plate at the Kth layer and an amount of misalignment between the cathode electrode plate at the Kth layer and the anode electrode plate at the (K−1)th layer may be used to determine an amount of misalignment amount between the cathode electrode plate and the anode electrode plate that are adjacent. For the innermost layer, an amount of misalignment between the cathode electrode plate at the innermost layer and the anode electrode plate at the innermost layer may be used to determine an amount of misalignment amount between the cathode electrode plate and the anode electrode plate that are adjacent.

Optionally, in this embodiment, an amount of misalignment between adjacent cathode electrode plates may be an amount of misalignment between a cathode electrode plate at a layer and an anode electrode plate at the layer.

In the inspection scheme for wound cell provided in this embodiment of this application, amounts of misalignment between the cathode electrode plate and the anode electrode plate that are adjacent in the wound cell can be accurately determined by using the image of the corner region obtained by imaging the corner region of the wound cell, thereby preventing cell products with a nonconforming amount of misalignment from entering the market and ensuring the quality of cells.

Optionally, in this embodiment of this application, the image of the corner region is obtained by using a micro-focus X-ray source to emit X-rays that penetrate the corner region for imaging, where a direction of the X-rays is perpendicular to a direction of a winding axis of the wound cell.

As shown in FIG. 3, the X-rays emitted by the micro-focus X-ray source in the direction perpendicular to the winding axis of the wound cell penetrate the corner region of the wound cell for imaging, to obtain an image of the corner region including the cathode electrode plate and the anode electrode plate at N layers of the corner region of the wound cell.

In the inspection scheme for wound cell provided in this embodiment of this application, the image of the corner region can be quickly and accurately obtained by using a micro-focus X-ray source to emit X-rays that penetrate the corner region of the wound cell for imaging, so that the amounts of misalignment in the wound cell can be quickly and accurately determined, improving the inspection efficiency and ensuring the quality of cell products.

Optionally, in this embodiment of this application, N is a total number of layers of the cathode electrode plate and anode electrode plate of the wound cell in the corner region.

In the inspection scheme for wound cell provided in this embodiment of this application, with the image of the corner region including all layers of the cathode electrode plate and anode electrode plate obtained by using the micro-focus X-ray source to emit X-rays that penetrate the corner region of the wound cell for imaging, amounts of misalignment can be accurately measured for the cathode electrode plate and the anode electrode plates of the wound cell that are adjacent at all layers, thereby preventing cell products with a nonconforming amount of misalignment from entering the market and ensuring the quality of cell products.

FIG. 5 is a schematic flowchart of an inspection method for wound cell according to an embodiment of this application. As shown in FIG. 5, the inspection method for wound cell may include some or all of the following contents.

510. Obtain an image of a corner region of a wound cell.

Descriptions about step 510 are similar to the relevant descriptions in step 210 and for the image of the corner region above, and details are not repeated herein in this application.

520. Determine first endpoints on a first plane for a cathode electrode plate at each of N layers of the corner region and second endpoints on the first plane for an anode electrode plate at each of the N layers in the image of the corner region.

The first plane is the plane that the winding axis is located on and that is perpendicular to the direction of the X-rays.

Due to different thicknesses at different positions of the wound cell and different materials of the cathode and anode, different positions in the image of the corner region imaged after X-ray penetration are different in grayscale. In other words, in the image of the corner region, the cathode electrode plate at each of the N layers of the corner region on the first plane and the anode electrode plate at each of the N layers on the first plane are greatly different in grayscale from other regions, which is easy to differentiate and identify.

Therefore, the cathode electrode plate at each of the N layers of the corner region on the first plane and the anode electrode plate at each of the N layers of the corner region on the first plane in the image of the corner region may be used to determine endpoints on the first plane for the cathode electrode plate and the anode electrode plate at each layer, helping determine the amount of misalignment based on the endpoints for the cathode electrode plate and the endpoints for the anode electrode plate.

It should be understood that in the case of the first plane being a plane that the winding axis is located on and that is perpendicular to the direction of the X-rays, the wound cell being on the first plane means being within an allowable range of error rather than strictly on the first plane, and perpendicular means being perpendicular with an allowable range of error rather than being strictly perpendicular.

530. Determine, based on the first endpoints and the second endpoints, amounts of misalignment between the cathode electrode plate and the anode electrode plate that are adjacent in the wound cell.

Optionally, in this embodiment of this application, a distance between two endpoints can be determined based on coordinates of the first endpoints and the second endpoints so that amounts of misalignment between the cathode electrode plate and the anode electrode plate that are adjacent are determined.

In the inspection scheme for wound cell provided in this embodiment of this application, when the X-ray penetrates the corner region for imaging, the grayscale of the anode electrode plate and the cathode electrode plate in the two-dimensional image of the corner region on the first plane that the winding axis is located on and that is perpendicular to the ray direction is quite different from that in other regions, which is easy to identify and differentiate. Therefore, with the endpoints on the first plane for layers of the cathode electrode plate and anode electrode plate in the wound cell, the amounts of misalignment between the cathode electrode plate and the anode electrode plate that are adjacent can be more clearly and accurately determined.

Optionally, in this embodiment of this application, in determining first endpoints on the first plane for the cathode electrode plate at each of the N layers of the corner region and second endpoints on the first plane for the anode electrode plate at each of the N layers in the image of the corner region, a neural network model can be used to determine the first endpoints and the second endpoints, where the neural network model is obtained by training using a plurality of marked wound cell images, and the plurality of marked wound cell images include information about marked endpoints on the first plane for the cathode electrode plate and marked endpoints on the first plane for the anode electrode plate.

In this embodiment, marked wound cell images such as marked images of a corner region can be used to train the neural network model so that the neural network model is used to identify endpoints for the cathode electrode plate and the anode electrode plate in the image of the corner region.

In the inspection scheme for wound cell provided in this embodiment of this application, the wound cell images are marked, and then the neural network model trained using the marked wound cell images is used so that the endpoints for the cathode electrode plate and the anode electrode plate can be accurately and quickly identified, improving the inspection efficiency.

FIG. 6 is a schematic flowchart of an inspection method for wound cell according to an embodiment of this application. As shown in FIG. 6, the inspection method for wound cell may include some or all of the following contents.

610. Obtain an image of a corner region of a wound cell.

Descriptions about step 610 are similar to the relevant descriptions in step 210 and for the image of the corner region above, and details are not repeated herein in this application.

620. Perform image enhancement on the image of the corner region.

In this embodiment, the visual effect of the image can be improved by selectively highlighting features of interest in the image of the corner region or suppressing some unwanted features in the image.

FIG. 7 is an image of a corner region after image enhancement according to an embodiment of this application. As shown in FIG. 7, the image of the corner region after image enhancement can more clearly display pixels on a first plane for a cathode electrode plate at each of N layers of the corner region and pixels on the first plane for the anode electrode plate at each of the N layers in the image of the corner region, thereby improving the visual effect of the image.

In the inspection scheme for wound cell provided in this embodiment of this application, the visual effect of the image can be improved by performing enhancement on the image of the corner region, for example, by increasing image definition, so that the amount of misalignment can be accurately measured and manual re-inspection can be conveniently performed by operators on the production line.

Optionally, in this embodiment of this application, the contrast of the image of the corner region can be increased to highlight pixels on the first plane for the cathode electrode plate at each of the N layers and pixels on the first plane for the anode electrode plate at each of the N layers, achieving image enhancement on the image of the corner region.

In the inspection scheme for wound cell provided in this embodiment of this application, the pixels on the first plane for layers of the cathode electrode plate and anode electrode plate can be highlighted by increasing the contrast of the image of the corner region, thereby facilitating accurate identification of the endpoints for layers of the cathode electrode plate and anode electrode plate and improving the accuracy in measuring amounts of misalignment.

Optionally, in this embodiment of this application, a first grayscale value can be used to replace a grayscale value for a first region and a second grayscale value is used to replace grayscale values for other regions in the image of the corner region except the first region, achieving image enhancement on the image of the corner region.

The first region includes a region in which pixels on the first plane for the anode electrode plate at each of N layers of the corner region and pixels on the first plane for the cathode electrode plate at each of the N layers in the image of the corner region are located.

Optionally, in this embodiment of this application, the first region may further include a region in which pixels for the ceramic layer shown in FIG. 7 are located.

In the image of the corner region shown in FIG. 7, a ceramic layer is further provided on one edge in the width direction of the wound cell, and the ceramic layer may be connected to a cathode electrode plate and a cathode tab. Optionally, the material of the ceramic layer may be AT9 or AT11.

Optionally, in this embodiment of this application, the first region is a region in which a grayscale range formed by the grayscale values on the first plane for the anode electrode plate at each of the N layers and the grayscale values on the first plane for the cathode electrode plate at each of the N layers is located. For example, if a grayscale range formed by the grayscale values on the first plane for the anode electrode plate at each of the N layers and the grayscale values on the first plane for the cathode electrode plate at each of the N layers is [a, b], the first region is a region in the image of the corner region in which grayscale values are within [a, b].

In the inspection scheme for wound cell provided in this embodiment of this application, the first grayscale value can be used to replace the grayscale values on the first plane for layers of the anode electrode plate and the cathode electrode plate, and the second grayscale value can be used to replace grayscale values for other regions in the image of the corner region. In this way, the images of the cathode electrode plate and the anode electrode plate in the corner region on the first plane can be clearly highlighted in the enhanced image of the corner region, which is convenient for identifying the first endpoints for the cathode electrode plate and the second endpoints for the anode electrode plate so that the amounts of misalignment are accurately measured.

630. Determine, based on the image of the corner region, amounts of misalignment between a cathode electrode plate and an anode electrode plate that are adjacent in the wound cell.

For relevant descriptions of determining, based on the image of the corner region, amounts of misalignment between a cathode electrode plate and an anode electrode plate that are adjacent in the wound cell, reference may be made to step 220 and/or steps 520 and 530. Details are not repeated herein in this application.

In the inspection scheme for wound cell provided in this embodiment of this application, amounts of misalignment between the cathode electrode plate and the anode electrode plate that are adjacent at more layers in the wound cell can be accurately measured. For example, amounts of misalignment between the cathode electrode plate and the anode electrode plate at all layers in a wound cell with 45 layers or more can be accurately measured, which is conducive to ensuring the quality and safety of cell products.

FIG. 8 is a schematic flowchart of an inspection method for wound cell according to an embodiment of this application. As shown in FIG. 8, the inspection method for wound cell may include some or all of the following contents.

810. Obtain a plurality of initial image frames of a corner region continuously acquired.

Optionally, in this embodiment of this application, the initial image of the corner region includes an image of a cathode electrode plate at N layers of the corner region of the wound cell and an anode electrode plate at the N layers. The initial image of the corner region is obtained by using a micro-focus X-ray source to emit X-rays that penetrate the corner region for imaging, and a direction of the X-rays is perpendicular to a direction of a winding axis of the wound cell, where N is a total number of layers of the cathode electrode plate and anode electrode plate of the wound cell in the corner region, N being a positive integer.

820. Perform average denoising on the plurality of initial image frames of the corner region to obtain an image of the corner region.

Optionally, in this embodiment of this application, average denoising may be performed on the plurality of initial image frames of the corner region to obtain an image of the corner region after average denoising.

In the inspection scheme for wound cell provided in this embodiment of this application, parallel denoising is performed on the plurality of initial image frames of the corner region continuously acquired so that noises caused by an imaging device and external environments are suppressed, improving the quality of the image of the corner region.

Optionally, in this embodiment of this application, a control power of the micro-focus X-ray source is positively related to the thickness of the corner region.

In other words, in this embodiment, if the corner region of the wound cell is relatively thick, the control power of the micro-focus X-ray source can be increased, enabling X-rays to penetrate the corner region of the wound cell, so that the image of the corner region of the wound cell is obtained.

In the inspection scheme for wound cell provided in this embodiment of this application, corner regions with different thicknesses can be imaged by adjusting the control power of the micro-focus X-ray source. A greater control power of the micro-focus X-ray source can be used for a thicker corner region of the wound cell, so that the image of cathode electrode plates and anode electrode plates in corner regions with different thicknesses can be obtained by adjusting the control power of the micro-focus X-ray source.

Optionally, in this embodiment of this application, the corner region includes four corner regions of the wound cell.

In other words, in measuring an amount of misalignment in the wound cell, the four corner regions of the wound cell can be imaged separately, and amounts of misalignment between the cathode electrode plate and the anode electrode plate that are adjacent in each corner region of the wound cell can be measured based on the images of the four corner regions of the wound cell.

In the inspection scheme for wound cell provided in this application, the accuracy in measuring amounts of misalignment in the wound cell can be improved by measuring amounts of misalignment between the cathode electrode plate and the anode electrode plate that are adjacent in the images of the four corner regions of the wound cell.

830. Perform image enhancement on the image of the corner region.

840. Determine first endpoints on a first plane for a cathode electrode plate at each of N layers of the corner region and second endpoints on the first plane for an anode electrode plate at each of the N layers in the image of the corner region.

850. Determine, based on the first endpoints and the second endpoints, amounts of misalignment between the cathode electrode plate and the anode electrode plate that are adjacent in the wound cell.

For descriptions about steps 830 to 850, reference may be made to relevant descriptions in steps 620, 520, and 530. Details are not repeated herein in this application.

860. Determine a minimum amount of misalignment between the cathode electrode plate and the anode electrode plate that are adjacent in the wound cell.

870*a*. Determine that the wound cell is a good product under the condition that the minimum amount of misalignment is within a preset range.

870*b*. Determine that the wound cell is a defective product under the condition that the minimum amount of misalignment is beyond a preset range.

In other words, in this embodiment, the wound cell can be determined as a good product if the amount of misalignment between the cathode electrode plate and the anode electrode plate that are adjacent is within a specified range; and the wound cell can be determined as a defective product if the amount of misalignment between the cathode electrode plate and the anode electrode plate that are adjacent is beyond a specified range.

In the inspection scheme for wound cell provided in this embodiment of this application, the inspection efficiency can be improved by using a minimum one of all amounts of misalignment to determine whether the wound cell is a good product.

It should be understood that, in the embodiments of this application, sequence numbers of the foregoing processes do not mean execution sequences. The execution sequences of the processes should be determined according to functions and internal logic of the processes, and should not be construed as any limitation on the implementation processes of the embodiments of this application.

Figure 9:
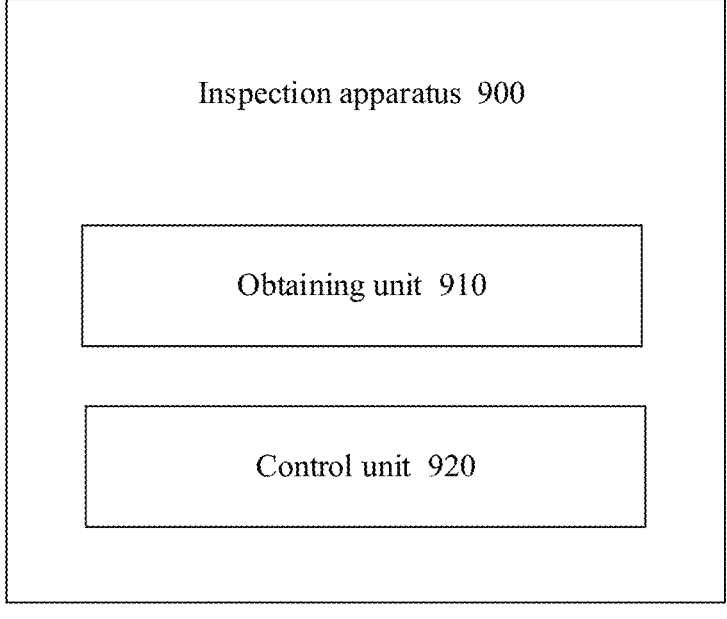
FIG. 9 is a schematic block diagram of an inspection apparatus for wound cell according to an embodiment of this application.
Figure 10:
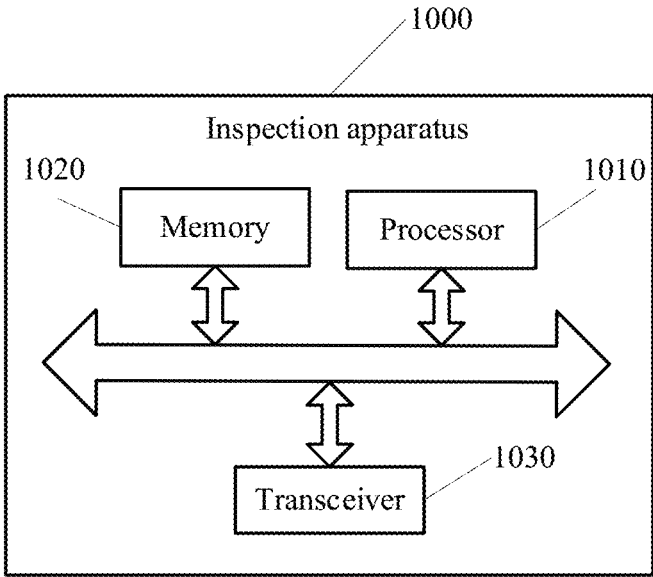
FIG. 10 is a schematic block diagram of an inspection apparatus for wound cell according to an embodiment of this application.

The foregoing has described in detail the inspection method for wound cell in this embodiment of this application, the following will describe in detail an inspection apparatus for wound cell in embodiments of this application with reference to FIG. 9 and FIG. 10, and the technical features described in the method embodiments are applicable to the following apparatus embodiments.

FIG. 9 is a schematic block diagram of an inspection apparatus 900 for wound cell according to an embodiment of this application. As shown in FIG. 9, the inspection apparatus includes some or all of the following contents.

An obtaining unit 910 is configured to obtain an image of a corner region of the wound cell, where the image of the corner region includes an image of a cathode electrode plate at N layers of the corner region of the wound cell and an anode electrode plate at the N layers, N being a positive integer.

A control unit 920 is configured to determine, based on the image of the corner region, amounts of misalignment between the cathode electrode plate and the anode electrode plate that are adjacent in the wound cell.

Optionally, in this embodiment of this application, the image of the corner region is obtained by using a micro-focus X-ray source to emit X-rays that penetrate the corner region for imaging, where a direction of the X-rays is perpendicular to a direction of a winding axis of the wound cell.

Optionally, in this embodiment of this application, N is a total number of layers of the cathode electrode plate and anode electrode plate of the wound cell in the corner region.

Optionally, in this embodiment of this application, the control unit is configured to: determine first endpoints on a first plane for the cathode electrode plate at each of the N layers of the corner region and second endpoints on the first plane for the anode electrode plate at each of the N layers in the image of the corner region, where the first plane is a plane that the winding axis is located on and that is perpendicular to the direction of the X-rays; and determine, based on the first endpoints and the second endpoints, amounts of misalignment between the cathode electrode plate and the anode electrode plate that are adjacent in the wound cell.

Optionally, in this embodiment of this application, the control unit is configured to use a neural network model to determine the first endpoints and the second endpoints, where the neural network model is obtained by training using a plurality of marked wound cell images, and the plurality of marked wound cell images include information about marked endpoints on the first plane for the cathode electrode plate and marked endpoints on the first plane for the marked anode electrode plate.

Optionally, in this embodiment of this application, the control unit is further configured to perform image enhancement on the image of the corner region.

Optionally, in this embodiment of this application, the control unit is configured to increase contrast of the image of the corner region to highlight pixels on the first plane for the cathode electrode plate at each of the N layers and pixels on the first plane for the anode electrode plate at each of the N layers.

Optionally, in this embodiment of this application, the control unit is configured to use a first grayscale value to replace a grayscale value for a first region and use a second grayscale value to replace grayscale values for other regions in the image of the corner region except the first region, where the first region includes a region in which pixels on the first plane for the anode electrode plate at each of the N layers and pixels on the first plane for the cathode electrode plate at each of the N layers are located.

Optionally, in this embodiment of this application, the obtaining unit is configured to: obtain a plurality of initial image frames of the corner region continuously acquired; and perform average denoising on the plurality of initial image frames of the corner region to obtain the image of the corner region.

Optionally, in this embodiment of this application, a control power for a focal spot size of the micro-focus X-ray is positively related to the thickness of the corner region.

Optionally, in this embodiment of this application, the corner region includes four corner regions of the wound cell.

Optionally, in this embodiment of this application, the control unit is further configured to: determine a minimum amount of misalignment between the cathode electrode plate and the anode electrode plate that are adjacent in the wound cell; determine that the wound cell is a good product under the condition that the minimum amount of misalignment is within a preset range; and determine that the wound cell is a defective product under the condition that the minimum amount of misalignment is beyond the preset range.

It should be understood that the foregoing and other operations and/or operations of the modules in the inspection apparatus 900 are used to implement corresponding processes in the foregoing inspection method for wound cell. For brevity, details are not repeated herein.

FIG. 10 is a schematic block diagram of an inspection apparatus 1000 for wound cell according to an embodiment of this application. As shown in FIG. 10, the inspection apparatus 1000 includes a processor 1010 and a memory 1020, where the memory 1020 is configured to store instructions, and the processor 1010 is configured to read the instructions and perform the methods in the foregoing various embodiments of this application based on the instructions.

The memory 1020 may be a separate device independent of the processor 1010, or may be integrated into the processor 1010.

Optionally, as shown in FIG. 10, the inspection apparatus 1000 may further include a transceiver 1030, and the processor 1010 may control the transceiver 1030 to communicate with other devices. Specifically, the transceiver 1030 may transmit information or data to other devices, or receive information or data transmitted from other devices.

It should be understood that the processor in this embodiment of this application may be an integrated circuit chip with a signal processing capability. In an implementation process, steps in the foregoing method embodiments can be implemented by using a hardware integrated logic circuit in the processor, or by using instructions in a form of software. Alternatively, the processor may be a general purpose processor, a digital signal processor (digital signal processor, DSP), an ASIC, a FPGA or other programmable logic devices, a discrete gate or a transistor logic device, or a discrete hardware component, and may implement or execute methods, steps, and logical block diagrams disclosed in the embodiments of this application. The general-purpose processor may be a microprocessor or any regular processor. The steps of the methods disclosed with reference to the embodiments of the application may be directly implemented by a hardware decoding processor, or may be implemented by a combination of hardware and a software module in a decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The non-volatile memory may be a read-only memory (read-only memory, ROM), a programmable read-only memory (programmable rom, PROM), an erasable programmable read-only memory (erasable PROM, EPROM), an electrically erasable programmable read-only memory (electrically eprom, EEPROM), or a flash memory. The volatile memory may be a random access memory (random access memory, RAM) and is used as an external cache. By way of example but not restrictive description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch-link dynamic random access memory (synchlink DRAM, SLDRAM), and a direct rambus random access memory (direct rambus RAM, DR RAM). It should be noted that the memory of the systems and methods described in this specification includes but is not limited to these and any other proper types of memories.

An embodiment of this application further provides a computer-readable storage medium for storing a computer program.

Optionally, the computer-readable storage medium may be applied to the inspection apparatus for wound cell in the embodiments of this application, and when the computer program is run on a computer, the computer is enabled to perform corresponding processes implemented by a control apparatus in various methods in the embodiments of this application. For brevity, details are not repeated herein.

An embodiment of this application further provides a computer program product including computer program instructions.

Optionally, the computer program product may be applied to the inspection apparatus for wound cell in the embodiments of this application, and when the computer program instructions are run on a computer, the computer is enabled to perform corresponding processes implemented by the inspection apparatus for wound cell in various methods in the embodiments of this application. For brevity, details are not repeated herein.

An embodiment of this application further provides a computer program.

Optionally, the computer program may be applied to the inspection apparatus for wound cell in the embodiments of this application, and when the computer program is run on a computer, the computer is enabled to perform corresponding processes implemented by the inspection apparatus for wound cell in various methods in the embodiments of this application. For brevity, details are not repeated herein.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses, modules, or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the application substantially or parts making contributions to the conventional art or part of the technical solutions may be embodied in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. An inspection method for a wound cell, comprising:
obtaining an image of a corner region of the wound cell, wherein in the image of the corner region, a cathode electrode plate and an anode electrode plate are visible at each of N layers of the corner region of the wound cell, N being a positive integer;
determining, from the image of the corner region of the wound cell, first endpoints on a first plane for the cathode electrode plate at each of the N layers and second endpoints on the first plane for the anode electrode plate at each of the N layers, the first plane being a plane on which a winding axis of the wound cell is located, the first plane being perpendicular to a direction of X-rays used to obtain the image, the first endpoints and the second endpoints being output as coordinate values by a neural network model obtained by training using a plurality of marked wound cell images that include information about marked endpoints on the first plane for the cathode electrode plate and for the anode electrode plate; and
determining, based on the first endpoints and the second endpoints, amounts of misalignment between the cathode electrode plate and the anode electrode plate that are adjacent in the wound cell, the determining the amounts of misalignment comprises determining, for each of the N layers and based on the coordinate values, a distance between the first endpoint and a corresponding second endpoint.

2. The inspection method according to claim 1, wherein N is a total number of layers of the cathode electrode plate and anode electrode plate in the corner region of the wound cell.

3. The inspection method according to claim 1, wherein the image of the corner region is obtained by using a micro-focus X-ray source to emit X-ray that penetrate the corner region for imaging, wherein a direction of the X-ray is perpendicular to a direction of the winding axis of the wound cell.

4. The inspection method according to claim 1, further comprising, before determining, based on the image of corner region, the amounts of misalignment between the cathode electrode plate and the anode electrode plate that are adjacent in the wound cell:
performing image enhancement on the image of the corner region.

5. The inspection method according to claim 4, wherein performing the image enhancement on the image of the corner region comprises:
increasing contrast of the image of the corner region to highlight pixels on the first plane for the cathode electrode plate at each of the N layers and pixels on the first plane for the anode electrode plate at each of the N layers.

6. The inspection method according to claim 4, wherein performing the image enhancement on the image of the corner region further comprises:
using a first grayscale value to replace a grayscale value for a first region and using a second grayscale value to replace grayscale values for other regions in the image of the corner region except the first region, wherein the first region comprises a region in which pixels on the first plane for the anode electrode plate at each of the N layers and pixels on the first plane for the cathode electrode plate at each of the N layers are located.

7. The inspection method according to claim 1, further comprising, before obtaining the image of the corner region of the wound cell:
obtaining a plurality of initial image frames of the corner region continuously acquired; and
performing average denoising on the plurality of initial image frames of the corner region to obtain the image of the corner region.

8. The inspection method according to claim 1, wherein:
the image of the corner region is obtained by using a micro-focus X-ray source to emit an X-ray that penetrates the corner region for imaging;
a direction of the X-ray is perpendicular to a direction of the winding axis of the wound cell; and
a control power of the micro-focus X-ray source is positively related to a thickness of the corner region.

9. The inspection method according to claim 1, wherein the corner region comprises four corner regions of the wound cell.

10. The inspection method according to claim 1, further comprising:
determining a minimum amount of misalignment between the cathode electrode plate and the anode electrode plate that are adjacent in the wound cell;
determining that the wound cell passes an acceptance criterion in response to the minimum amount of misalignment being within a preset range; and
determining that the wound cell fails the acceptance criterion in response to the minimum amount of misalignment being beyond the preset range.

11. An inspection apparatus for a wound cell, comprising:
an X-ray source and a detector, the X-ray source and the detector being configured to obtain an image of a corner region of the wound cell, wherein in the image of the corner region, a cathode electrode plate and an anode electrode plate are visible at each of N layers of the corner region of the wound cell, N being a positive integer; and
a processor and a memory storing instructions that, when executed by the processor, cause the processor to:
determine, from the image of the corner region of the wound cell, first endpoints on a first plane for the cathode electrode plate at each of the N layers and second endpoints on the first plane for the anode electrode plate at each of the N layers, the first plane being a plane on which a winding axis of the wound cell is located, the first plane being perpendicular to a direction of X-rays used to obtain the image, the first endpoints and the second endpoints being output as coordinate values by a neural network model obtained by training using a plurality of marked wound cell images that include information about marked endpoints on the first plane for the cathode electrode plate and for the anode electrode plate; and determine, based on the first endpoints and the second endpoints, amounts of misalignment between the cathode electrode plate and the anode electrode plate that are adjacent in the wound cell, the determining the amounts of misalignment comprises determining, for each of the N layers and based on the coordinate values, a distance between the first endpoint and a corresponding second endpoint.

12. The inspection apparatus according to claim 11, wherein N is a total number of layers of the cathode electrode plate and anode electrode plate in the corner region of the wound cell.

13. The inspection apparatus according to claim 11, wherein the image of the corner region is obtained by using a micro-focus X-ray source to emit an X-ray that penetrates the corner region for imaging, wherein a direction of the X-ray is perpendicular to a direction of the winding axis of the wound cell.

14. The inspection apparatus according to claim 11, wherein the processor is further configured to:

perform image enhancement on the image of the corner region.

15. The inspection apparatus according to claim 14, wherein the processor is further configured to:

increase contrast of the image of the corner region to highlight pixels on the first plane for the cathode electrode plate at each of the N layers and pixels on the first plane for the anode electrode plate at each of the N layers.

16. The inspection apparatus according to claim 14, wherein the processor is further configured to:

use a first grayscale value to replace a grayscale value for a first region and use a second grayscale value to replace grayscale values for other regions in the image of the corner region except the first region, wherein the first region comprises a region in which pixels on the first plane for the anode electrode plate at each of the N layers and pixels on the first plane for the cathode electrode plate at each of the N layers are located.

* * * * *